United States Patent [19]
Gancy

[11] Patent Number: 5,162,580
[45] Date of Patent: Nov. 10, 1992

[54] PROCESS FOR THE MANUFACTURE OF MAGNESIUM CALCIUM ACETATE

[76] Inventor: Alan B. Gancy, 8810 Wandering Way, Baldwinsville, N.Y. 13027

[21] Appl. No.: 217,660

[22] Filed: Jul. 12, 1988

[51] Int. Cl.$^5$ .............................................. C09K 3/18
[52] U.S. Cl. .................................. 562/607; 562/608
[58] Field of Search .......................... 562/607; 252/70

[56] References Cited

U.S. PATENT DOCUMENTS 4,606,836  8/1986  Gancy .................................... 252/70
4,699,725  10/1987  Gancy .................................... 252/70

Primary Examiner—Arthur C. Prescott

[57] ABSTRACT

Superior quality magnesium calcium acetate (hydrate) granules of industrial grade are produced from a concentrated aqueous solution of magnesium acetate containing limited amounts of calcium acetate. The hot solution, or process liquor, is carefully pH-adjusted prior to further processing, and may be slightly acidified with excess acetic acid to offset downstream hydrolysis during the granulation/drying stage.

Process liquor hydrolysis is avoided by maintaining liquor temperature and residence time within prescribed limits.

Process liquor may be optionally clarified of mineral insolubles deriving from raw material, and of excess, unwanted calcium acetate solids prior to further processing. From such clarified liquor a purer, technical grade magnesium acetate (hydrate) granular product is derived.

Hot process liquor may be passed through a short residence time heating zone prior to granulation/drying in order to provide additional sensible heat going to the granulation/drying operation. At the short residence times prescribed, hydrolysis of process liquor is avoided.

A key feature of the invention is the relatively low energy requirement, due to the low process liquor drying requirement. Such a low net water loss requirement is due to the unusually high concentrations of process liquor achievable, and to the production of a stable tetrahydrate of magnesium acetate product.

Product granules of the present invention, free of unreacted ore, and of hydrolysis product, show much improved rates of ice-melting, and are elatively less corrosive to metals.

14 Claims, No Drawings

PROCESS FOR THE MANUFACTURE OF MAGNESIUM CALCIUM ACETATE

BACKGROUND OF THE INVENTION

Magnesium calcium acetate has emerged in recent years as a viable, relatively non-polluting replacement for salt (sodium chloride), urea and ethylene glycol pavement surface deicers. However, the low-water, low-energy processes which have been developed to produce the material possess inherent limitations which inevitably lead to products of inferior quality. Specifically, such products are slow to dissolve in water, and therefore to melt ice. Moreover, impurities present in these products as a result of the inherent difficulties in process control are the direct cause of metallic corrosion, particularly of aircraft materials of construction.

The present invention retains the low-energy process features required to meet demands of low cost, while at the same time eliminating the undesirable characteristics of product, by virtue of a novel processing concept. Furthermore, a process option emerges which allows for production of a low-cost technical grade product which may have utility in non-deicer applications.

DESCRIPTION OF PRIOR ART

In U.S. Pat. Nos. 4,606,836 and 4,699,725, I describe processes for producing magnesium calcium acetate from acetic acid and ores containing active MgO and CaO. In these processes acid, ore, and a critically important amount of water were comingled in such a way as to produce a moist solid intermediate which was then generally dried to produce the final product. The amount of water in the process was kept deliberately low in order to minimize final drying requirements, thus yielding a low-cost process/product.

One major problem with such processes is that it is difficult to achieve the exact stoichiometric balance of reactants so as to end up with an exactly neutral product. Thus if acid were in excess, either accidentally, or deliberately in order to override normal variations in the feed rates, the product would be over-acidic and unsuitable for use. The remedy in this case is to drive off excess acid in the drying process, a procedure which necessarily entails scrubbing the dryer exit gas to avoid atmospheric pollution. This in itself adds a cost burden to the manufacturing process. And, unless this expensive acid component loss is recycled to process there is a further cost penalty.

There is yet another problem which use of excess acid does not necessarily solve. Under some processing circumstances, excess acid cannot react with raw ore which has been encapsulated by (viscous) product liquor. The end result is the very real albeit unusual circumstance of acid and base both being present in the final product, but unable to react with one another. If the excess acid is now driven off from such a product in the dryer, the result is a material containing excess, unreacted ore. This unreacted ore has been found to be directly responsible for corrosion of aircraft metal materials of construction during application of this deicer to airport runways.

Obviously, if one deliberately operated with a stoichiometric excess of ore in the process, that excess would show up in the product, with the consequent corrosion problem mentioned heretofore.

Thus, in the early evolutionary stages of acetate deicers, it was believed that a crude product would suffice for an end use which apparently did not demand purity of product. As the art advanced, however, it became apparent that at least one inherent impurity could not be tolerated for certain deicer end uses—unreacted ore.

The corrosive effect of unreacted ore is as follows: As the deicer becomes essentially completely dissolved (in water) as it performs its deicing function, a residue of unreacted ore is left behind in addition to granular insolubles already present in the ore. The unreacted ore particles impinge upon aircraft metallic surfaces. These particles, highly alkaline and relatively insoluble in water, attack the metallic surfaces at the points where they impinge. It has been independently shown that the natural granular insoluble materials present in the ore ($Fe_2O_3^-$, $Al_2O_3^-$ and $SiO_2^-$ based minerals) are not responsible for such inpingement corrosion.

The aforementioned difficulties in processing according to my own prior art are further compounded by the uncertainties in raw material feeding. These are of two types:

1.) Normal variations in feed control, outside of accidental excursions in feed rates, and
2.) Variations in raw material quality.

As to the latter, for example, active magnesia raw material has a reasonable but limited shelf life. It can pick up water (and carbon dioxide) so as to throw off the calibrated feed rate. To operate in such a way as to ensure a known, controlled input stoichiometry therefore requires constant analytical monitoring of feed stocks, with consequent constant alteration in feed calibration. Whereas this can indeed be incorporated into the operations manual, it represents an inherent processing complication which is better avoided if possible.

The need for precise control is necessitated by the continuous nature of the processes; once a segment of process flow is off-specification there is no way to correct it. Even if such processes were operated on a batch basis, there is an inherent difficulty in correcting the composition of a moist solid product once it has gone off-specification, even discounting the difficulty of ore encapsulation.

There is a further and equally serious consequence of residual, unreacted ore in the product. I have found that this material forms a loosely coherent insolubles network within the final product pellet. As the pellet dissolves quiescently in performing its deicing function, this network is left behind to form a diffusion barrier which significantly slows the pellet dissolution rate. In some cases a skeletal network is left behind in roughly the same shape as the original undissolved pellet. I have made a mathematical analysis of this barrier phenomenon, which proceeds through a first-order differential equation, to the final dissolution equation. The result, consistent with experience, describes a dissolution process which becomes ever slower with elapsed time. By contrast, without the skeletal diffusion barrier the dissolution rate is fairly constant with elapsed time. Mathematically, the skeletal network phenomenon gives rise to the simple equation $$\text{Dissolution Rate} = (\text{Constant}) \div (\text{time})^n,$$

where n is a small number greater than zero. Another way to express it is to say that the dissolution rate is inversely proportional to elapsed time.

In its strictest interpretation the equation would predict that the deicer pellet would take an enormous amount of time to dissolve, far beyond the practical demands of deicing. In fact, this does not happen. The reason is that the skeletal barrier is not perfectly homogeneous and intact. Nonetheless, the barrier can result in dissolution times which are a factor of 5 longer than a network-free particle dissolving time. This has real practical significance in deicing. One of the first questions a potential user asks about a new deicer product concerns its rate of deicing immediately upon application.

Unreacted ore is not the only potential source of the skeletal barrier. It can also be formed through hydrolysis of the product during the drying process. Magnesium calcium acetate in contact with water will hydrolyze to form insoluble basis products, plus acetic acid:

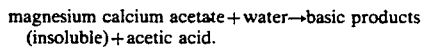

The basic products include the metal oxides and hydroxides, and may include basic acetates. This hydrolysis process is accelerated by heat, such as in a drying operation. Furthermore, the equilibrium is shifted to the right through loss of volatile acetic acid. This shift results in higher levels of the basic, insoluble materials which can make up the skeletal network. What is preferred in an improved process, therefore, is a minimizing or virtual elimination of the hydrolysis phenomenon. The present invention indeed also addresses itself to this point.

One potential answer to all of the process/product problems described is the conventional crystallization-from-solution route. Raw materials are reacted and diluted with sufficient water to dissolve all product except, of course, mineral insolubles. The latter are settled, and the process liquor filtered. This liquor is then put through heating/cooling cycles with a crop of product crystals yielded for each cycle. There are several difficulties with this approach. First, whereas the magnesium acetate component of the solution behaves normally regarding increase in solubility with temperature, the calcium acetate component behaves abnormally. Its solubility drops with increasing process liquor temperature. Furthermore, the solubility of calcium acetate, even at room temperature, is relatively low. This necessitates the use of large volumes of process liquor.

A further drawback to conventional crystallization is that it is not known what product species will crystallize; i.e., the phase diagram of the $Ca(Ac)_2$—$Mg(Ac)_2$—$H_2O$ system over a range of temperatures is not known.

The most important drawback from a product point of view is that conventional crystallization produces—crystals. In the $Mg(Ac)_2$—$H_2O$ system, for example, the typical product is magnesium acetate tetrahydrate crystals in a form resembling granulated cane sugar. Such a product is unsuitable for deicing. Rather, what is needed is a non-spherical pellet ranging from 3 to 6 mm. in diameter. In this particular case, the crystalline product happens to cake badly in storage, a property not found when the self same chemical is produced in pellet form according to my present invention. Pellets are preferred not only for their size and density, but for their relatively high resistance to friability. They possess rounded instead of sharp crystalline surfaces.

One variation on the crystallization theme is to prepare a (slightly undersaturated) ultraclear process liquor, then spray it through high pressure nozzles into a fluidized bed dryer. This was actually carried out in a full scale pilot plant, with disastrous results. Approximately 50 mols of water had to be removed per mol of solid product; therefore, the bed was operated hot, over 100° C., in order to ensure a reasonable production rate. The presence of hot fluidizing gases shifted the hydrolysis equilibrium so far to the right that the pH of product solution in water was a prohibitive 10. The desirable pH should have been 7-8. Furthermore, this process resulted in a highly friable, dusty product, also prohibitive in ice-melting technology. Thus an ultraclear process liquor (so as not to plug the nozzles) was converted into a product which, when dissolved to the same dilution, was loaded with insoluble hydrolysis products, a rather ironic turn of events.

A not inconsiderable drawback to conventional crystallization is the high fixed capital requirement for process hardware. This translates to a higher cost of production, something which cannot be tolerated for a deicer whose inherent cost is already higher than that of salt (sodium chloride). Crystallization processes, while highly evolved in a chemical engineering sense, are not simple. The present invention represents a much simplified route, with lower attendant capital and operating costs.

It is evident that all the known and potential prior art approaches lead to an unsatisfactory result either in terms of cost or product quality. This consideration has lead directly to the conceptualization and reduction-to-practice of the present invention.

OBJECTS OF THE INVENTION

One object of the invention is to provide an economical, industrially feasible process for the production of a relatively non-polluting magnesium calcium acetate deicer of industrial grade.

Another object is to provide a process to manufacture a low cost technical grade magnesium acetate hydrate.

It is a further object to produce a magnesium calcium acetate pellet which dissolves readily in water under quiescent dissolving conditions.

Yet another object of the invention is to provide a simple, low-cost process for manufacturing a magnesium calcium acetate product substantially free of unreacted raw material ore.

It is a further object of the invention to provide a magnesium calcium acetate pellet product substantially free of hydrolysis products.

Another object is to provide a free-flowing, non-friable industrial grade magnesium calcium acetate product suitable for use as a deicing and an anti-icing agent for pavement surfaces.

It is also an object of this invention to produce a magnesium calcium acetate product which is relatively non-corrosive to metals of aircraft construction, and to other metals.

SUMMARY OF THE INVENTION

The invention consists in two major phases of manufacture:
1.) Process liquor preparation, followed by
2.) Granulation/drying The key features of this invention regarding solution preparation are as follows:

1.) Final adjustment of the stoichiometric balance (process liquor pH) prior to the next stage, granulation/drying.

2.) Optional control of the process liquor pH so as to offset potential hydrolysis in the next stage.

3.) Raising the temperature of the (already hot) process liquor as it flows from the solution preparation reactor/reservoir to the spray nozzles in the granulator/dryer, in such a way as to obviate hydrolysis enroute.

4.) Achievement of high solution concentrations through avoidance of hydrolysis.

5.) Optional settling/filtration of process liquor so as to produce a technical grade product, as opposed to an industrial grade product.

The key features of the granulation/drying stage are:
1. Ready formation of (non-spherical) pellets.
2. Avoidance of hydrolysis during granulation.
3. Production of high crush-strength, low-friability pellets or granules.
4. Ready control of pellet particle size distribution.

DISCUSSION

A 10% solution of neutral magnesium acetate tetrahydrate in water, for example, is 7.4 at room temperature. From a deicer end use standpoint, a product solution pH of 7.0–8.5 can be tolerated. If the pH is lower than this, then the material is known to attack Portland Cement concrete. If it is higher, metal hydroxide will precipitate out causing problems of metal corrosion in end use. Further, the higher pH product will not dissolve readily due to the formation of the skeletal diffusion barrier. Hence it is important to maintain process control via control of process liquor pH, right from the start.

Acetic acid, water, and the appropriate ore mixture are therefore introduced to the reactor, with agitation. The reactor can be outfitted with overhead condensers to prevent acetic acid vapors from escaping the (hot) reactor. Considerable heat is provided by the exothermic chemical reaction of raw materials. Additional heat may be supplied, as needed, to maintain high process liquor temperature prior to granulation/drying.

The reactor also functions as the process liquor reservoir in a batch or even in a continuous operation. Sufficient water is supplied to the reactor to completely dissolve the magnesium acetate. The pH of the liquor is monitored by taking a sample of liquor, diluting it to 1–10% with water, and measuring the pH. If the pH falls outside the range 7.0–8.5, the appropriate raw material (acid or ore) is added to the reactor until the pH is correct.

I have discovered that the reaction of acetic acid with even active MgO, for example a so-called lightburned grade, is slow at room temperature. By maintaining a reactor temperature of at least 50° C. the reaction is considerably accelerated. Residence times are reduced from hours to just a few minutes, say 5 minutes. Such reactor temperature can be achieved by insulating the reactor so as to prevent loss of exothermic reaction heat. Further heating from external sources can be supplied as needed.

Prior art practitioners, evidently unaware of the accelerating effect of heat on the acid/ore reaction, resorted to an elaborate 5-stage countercurrent reaction system to assure completion of reaction. This resulted in capital costs which were enormous compared to those of the simple train of the present invention.

As one moves in liquor composition towards higher magnesium levels, i.e., approaching that of straight magnesium acetate, process liquor viscosity increases. Surprisingly, however, I have found that by keeping process liquors hot, above 60° C., the solution viscosity is sufficiently low that further processing through spray nozzles is not problematic. The problem is, however, that maintenance at elevated temperature for too long a time (see Example I) results in hydrolysis. The end result is a precipitation of basic solids out of formerly clear liquor; this occurs even in a hermetically sealed system where acid vapors resulting from hydrolysis cannot escape. Hydrolysis at elevated temperature, I have discovered, is slow enough in this system that liquors can be safely maintained at high temperature merely by limiting the residence times at that higher temperature.

The advantage of short liquor residence times at elevated temperature is 3-fold;
1.) hydrolysis is avoided
2.) higher solution concentrations can be produced
3.) process liquor viscosity is not problematic.

The process liquor preparation stage may be broken up into two substages. In the first, a temperature is maintained at which the system can be held indefinitely without the risk of hydrolysis. For example, the system $(Mg(Ac)_2 + 8 H_2O)$ can be held at 70° C. without formation of hydrolysis products. In order to supply more sensible heat to this liquor prior to spraying, its temperature may be raised to, say, 80° C. in a second stage where residence time is maintained at a low value, say less than 1 hour. This second stage need be no more than a coil surrounded by a heating zone. This two-stage scheme allows a large reservoir of liquor to be maintained, while at the same time providing the desired sensible heat to process liquor just prior to spraying. As such, it provides an added degree of flexibility to the granulation/drying operation in that more or less sensible process liquor heat may be maintained at will.

To achieve a final high concentration of process liquor, prior to spraying, a slurry may be maintained in the first liquor stage, which, when passed through the second higher temperature stage, becomes a clear liquor. Thus the system $(Mg(Ac)_2 + 7 H_2O)$ may be maintained at 60° C. as a slurry of $Mg(Ac)_2.4 H_2O$ crystals in $Mg(Ac)_2$ liquor; when this slurry is passed through a second stage where it is heated to 80° C. it becomes a clear solution. Slurry is kept in the second stage long enough to dissolve the crystals, but not long enough to hydrolyze the system. Such residence times will be an hour, more or less. Agitation of the system in the second stage is obviously required in order to provide good heat transfer, and to prevent hydrolysis at heat transfer surfaces.

Under some circumstances process liquor pH may be made deliberately more acidic than pH 7 in order to offset hydrolysis downstream. For example, I have discovered that when a 75° C. $Mg(Ac)_2$ solution is sprayed into a granulation bed dried by room temperature air, virtually no hydrolysis occurs in the granulation/drying step. A process liquor solution pH of 7.5 becomes a product solution pH of 7.5. However, when that (tetrahydrate) product is placed in a 60° C. drying oven for an hour, the product pH in water goes to 8.4. Some hydrolysis has occurred in the oven, caused by water of hydration. The product residence time in the oven is longer than the residence time in the granulator, and this is primarily responsible for the greater degree of hydrolysis of the oven-treated product. By deliberately acidifying the liquor prior to spraying, such downstream hydrolysis can be offset completely (see Example I).

Acidification of process liquor can also be used as a means of forestalling hydrolysis during liquor storage, even when the system is hermetically sealed (see Example I). In such case the final product granules may be slightly acidic. This may be permissible for some end use applications of magnesium acetate, for example. If not, excess acid may be volatilized out of the product during a final product drying step. As discussed earlier, final drying as an excess-acid removal step is an undesirable practice, but may be used if there is a net favorable trade-off.

The higher the process solution concentration, the more economical the entire manufacturing process. This is because downstream removal of water is costly. The short residence time feature of the present invention permits the attainment of concentrations significantly above those reported in the equilibrium phase data literature for this system. The literature does mention hydrolysis at higher temperatures, but makes no attempt to measure its rate, as I have done. Those investigators would not have conceived the short residence time feature because they are always looking towards thermodynamic equilibrium, and are willing to wait hours, or even days to achieve it.

However, the process of invention is attractive even when only the first solution stage is used alone, without the second, higher temperature stage. The reason is that in this case—taking the straight Mg(Ac)$_2$ extreme composition variant—a stable hydrate product is produced. This means that the net water removal requirement is favorably diminished. For example, using the first process liquor stage alone, at 70° C., the net process reaction is

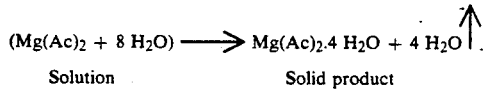

There is a net removal of only 4 mols of water per mol of magnesium acetate product. This is surprising, and significantly more attractive than the prior art which required the removal of 50 mols of water in drying a process liquor. The situation improves, of course, with more concentrated process liquors produced out of the second, higher temperature stage. For example,

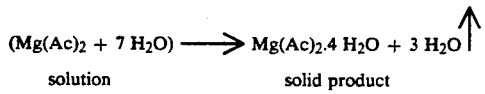

This is not to say that the tetrahydrate product could not be further dried if desired. I have found that 3 more mols of water can be readily removed. Removal of the last mol of H$_2$O is difficult. Also, the more water removed in drying, the greater the extent of hydrolysis, and this would have to be offset by deliberately acidifying the process liquor. But this excess acid would eventually be evolved in the dryer, and the exit gases would require scrubbing.

There are compelling reasons for selecting the tetrahydrate of magnesium acetate as the desired product hydration state. Firstly, the tetrahydrate is the virtual thermodynamically stable phase of the acetate over a wide range of temperatures and relative humidities. Hence, neither efflorescence nor atmospheric moisture absorption would be a problem in storage. Secondly, the potential shipping weight penalty (a tetrahydrate vs. a "monohydrate", for example) is not a real problem. For example, calcium chloride dihydrate sells well in the industry, even though a near-anhydrous calcium chloride product is commercially available. The reason is that the extra cost of shipping dihydrate is offset by the energy requirements to produce the anhydrous variant. Also, there are product characteristic preferences which enter into the consumers' decision to buy one over the other. Further, in the case of deicing applications, there is evidence that the presence of hydrate water in the deicer helps to "start" the deicing process.

In summary, the novel reaction/solution step of the present invention represents a low energy, low cost route to product because only a small net removal of water is required downstream, no matter which solution process variant is used. Further, I have discovered the conditions whereby solution may be stored indefinitely without the troublesome problem of hydrolysis. I have also discovered conditions whereby even higher solution concentrations can be achieved while at the same time avoiding hydrolysis; these conditions are higher temperature and shorter process residence times.

Process liquors may be sprayed into granulators without having been first filtered. For example, using one particular raw material source of crude MgO, process liquors will contain around 0.1% by weight of mineral insolubles. These insolubles will pass a 200 mesh sieve. These insolubles end up in the industrial grade product which is now perfectly suitable for any deicing/anti-icing application. In one process variant, however, these solids are easily settled/filtered out to produce a technical grade product containing virtually no insolubles. Such a product could command a higher price inasmuch as it can compete with high cost acetates already used in other, nondeicing end use applications such as in textile treatment. Such high cost acetates are produced by conventional crystallization. Whereas there is nothing novel about a filtration step to remove insolubles from solution, taken in its total context the process is novel and useful in that, for the first time, a low cost technical grade magnesium (calcium) acetate can be made available for commerce.

Process liquor filtration would be carried out just subsequent to the first liquor preparation stage, i.e., before liquor passed optionally to a higher temperature short residence time stage.

As for raw materials going in to make up the process liquor, the magnesium-rich ore may be a calcined magnesite. Alternatively, it may be a crude MgO manufactured from dolomite and magnesium chloride brines. Calcined dolomite may represent one consitutent in a blend of ore feeds, as will be appreciated by one skilled in the art. To a limited degree, the magnesium-rich ore can contain calcium which will then end up in the final industrial grade product as calcium acetate. There is also the option of filtering of process liquors, which limits the level of calcium in the product according to the solubility of calcium acetate in magnesium acetate process liquor.

Light-burned magnesia is a preferred raw material because of its ready reactivity with acetic acid under the reaction conditions of my invention. However, in order to produce a higher purity product, a hard-burned MgO may also be used. The latter, for example, contains considerably lower levels of chloride impurity than does the light-burned grade. In this case, hard-burned MgO, comprising the majority of the input ore, is reacted with excess acetic acid. The resulting solution is now "topped" with light-burned ore to produce the desired process liquor pH.

Acetic acid input may comprise a blend of merchant grade glacial acetic acid and water. Alternatively, it may comprise a dilute aqueous acetic acid process stream, finally adjusted to the correct dilution prior to use in this process. It is notable that the process of this invention does not require a highly concentrated acid, but uses instead an acid strength of 50% by weight, more or less. This is advantageous in that it allows for use of dilute acid process streams as raw material, or even by-product (impure) acid streams such as result, for example, from acetomenaphen manufacture. Furthermore, the process of invention can utilize mixed acid sources such as would result from fermentation processes.

Process liquor is now prepared to pass to the granulation/drying stage of the overall process. The drying of $Mg(Ac)_2$ solutions is, to say the least, problematic. The high viscosity of such solutions is well known. I have discovered an additional difficulty in drying resulting from the formation of a rubbery skin atop solutions or droplets exposed to a drying atmosphere. This skin dramatically slows the rate of drying. Drying of solutions or melts at higher temperatures to produce granules or pellets results in an overdrying of outer surfaces, with (hot) particles containing viscous liquor at their centers. Drying at lower temperatures is prohibitively slow (see Example IV).

Therefore, a major feature of the present invention is the successful conversion of process liquor to dry granules of high crush strength and low friability. This successful operation, I have discovered, is characterized by the spraying of hot process liquor onto a moving bed of granules, while at the same time providing a current of air to effect drying. This in essence applies hot solution to existing particles in thin layers that are quickly and easily dried. The dried layers then build up until the desired product size distribution is attained.

The process of this invention is not equivalent to the wellknown current art of pan granulation in which, for example, molten urea is sprayed into a moving bed. In the case of urea, the phenomenon is one of cooling a molten solid in such a way that it freezes to form a granular product. No solvent is evaporated in this technology.

A favorable feature of the granulation/drying process of invention is that heat is evolved from within the granule as supersaturated liquor in thin layers is converted to crystalline product. This is the well known heat of crystallization which, in the present invention, is positive, and aids in the drying of product. Another favorable feature is the self-cooling at the surface of the granule, resulting from the evaporation of water at that site. This self-cooling helps to regulate the bed temperature so as to help avoid undesired hydrolysis. Thus, when a 75° C. process liquor was sprayed into a moving bed, and simultaneously dryed with a current of room temperature air, virtually no hydrolysis of product occurred.

An unanticipated feature was discovered in that granules which are discharged from the dryer possess an acceptable crush strength, but as the granules cure over several hours in a closed vessel (so that further drying could not have occurred), their crush strength increases dramatically. Whether this results from further growth of microcrystals within the granules, or regrowth of crystals is not understood.

Another favorable feature of granulation/drying in the present invention is that spherical granules are not forthcoming. Instead, "potato-shaped" granules are produced. This is highly desirable in a deicing/anti-icing agent. Otherwise, a spherical particle would tend to bounce from the pavement upon application, whereupon it becomes windbourne and does not fall where it is placed. Furthermore, spherical particles are known to roll, whether on bare pavement or upon ice or hard-pack, and again do not remain where they are dropped from spreaders. There is a further objection to spheres in that they function as ball bearings. There is the real danger that pedestrians can slip and fall when walking over an area treated with deicer.

The process of invention depends upon the ability to spray process liquor onto a moving bed of granules. Spray nozzles are commercially available which can spray solutions containing finely divided solids. There are two types of solids which are generally present in the present case. The first is in the form of mineral insolubles which are present in the ore. A finely divided ore feed means that the mineral insolubles will also be fine, and these will be successfully sprayed in company with liquor. One process option, nonetheless, is to settle/filter the process liquor prior to spraying. This would be for the purpose of producing a higher purity product which now moves from a crude or industrial grade material to a technical grade product. The other solid generally present in process liquor is undissolved calcium acetate. This is undissolved because of the deliberate maintenance of a high liquor concentration, as well as a relatively high mol fraction of calcium present. Calcium mol fraction is defined as $$\frac{\text{mols Ca}}{\text{mols Ca} + \text{mols Mg}}.$$

$Ca(Ac)_2$ acetate is less soluble than $Mg(Ac)_2$. I have discovered the solubility of calcium in these systems is about 4 mol % (see example II). Fortunately, I have discovered, any undissolved calcium acetate is in the form of a delicate floc which is well distributed throughout the agitated process liquor, and does not clog spray nozzles. The higher the relative calcium input, the greater the concentration of undissolved floc.

The choice of calcium/magnesium ratio in process liquors, and therefore in product, is a tradeoff. Magnesium acetate is the superior deicer. However, magnesium-containing ore is generally more expensive than calcium ore. There may be some specialty applications of the product(s) of this invention wherein no calcium content will be tolerated, and so the desired product becomes magnesium acetate hydrate in the form of granules. These granules, I have discovered, do not suffer the severe caking problem in storage of commercially available crystalline magnesium acetate tetrahydrate.

Because of the uproblematic physical characteristics of $Ca(Ac)_2$ floc in the process liquor, high concentrations of process liquor containing calcium are found to be possible. More accurately, liquors containing appreciable concentrations of floc can be termed slurries.

These slurries, amenable to spraying and granulation, are to be contrasted to such liquors diluted with water until all of the $Ca(Ac)_2$ insolubles dissolve. Such diluted liquors would require considerably more energy to dry.

When calcium inputs are high enough to result in process slurries, obviously settling/filtration is not feasible for removal of the total amount of ore insolubles. Such filtration would remove $Ca(Ac)_2$ as well as insolubles. On the other hand, in cases where the amount of calcium in the product is designed to be limited, and the magnesium ore unavoidably contains some calcium, filtration is a feasible means for removing such excess unwanted calcium in the form of $Ca(Ac)_2$. Such filtered liquors will, however, still contain calcium at its solubility limit of about 4% mol fraction.

The process of drying the process liquor of the present invention is not confined to spraying onto a moving bed of product granules. Process liquor, unfiltered or filtered, can be spray-dried, for example. Liquor is sprayed into conventional spray-drying towers to produce a typical spray-dried product whose particle size will be smaller than that of a granule, viz., smaller than 3-6 mm. in diameter. Such spray-drying, however, must be carried out in such a way to avoid hydrolysis of product. As before, one approach is to maintain a 1-5 mol % excess of acetic acid in the process liquor. This will bring the liquor to pH 6.5 or less. A better approach is to limit the temperature/time experience of the drying product particle. Given the residence-time limitations of a spray-drying operation, for example, particle temperature is better kept below about 80° C.

Other drying techniques are feasible. The process liquor of the present invention may be fed to the external surface of a rotating drum called a flaker. Again, pains must be taken to avoid hydrolysis of product. The product of a flaking operation has a certain advantage for deicing applications in that it does not bounce or roll when applied to pavement surfaces to the same extent as do granules.

DESCRIPTION OF PREFERRED EMBODIMENTS

The following examples will illustrate the key features, characteristics, and embodiments pertaining to the invention:

EXAMPLE I

Stability of $[Mg(Ac)_2+8\ H_2O]$ Melts

Into each of three hermetically sealed jars (I., II., and III.) were introduced 59.0 parts of $Mg(Ac)_2.4H_2O$ crystals, and 19.8 parts distilled water. I. remained unacidified. Into II. were introduced 0.35 parts glacial acetic acid. Into III. were introduced 0.70 parts acid.

The 3 jars were placed in a 62° C. oven. After 4 hours, the solutions in each jar were clear. After an additional 8½ hours' heating, the unacidified solution showed a very slight haze, and the solution in jar III. was virtually clear. Jar II. solution was intermediate between the two.

Oven temperature was raised to 72° C. After four hours forty-five minutes at this temperature, the turbidity level in each jar was unchanged from the 62° C. regime.

After an additional 42 hours of heating at 72° C., jar I. solution was highly turbid. Jar III. solution was essentially clear, with jar II. solution containing a very slight haze.

Oven temperature was raised to 83° C. Two and one-half hours later, solution in jars II and III. were unchanged in appearance. After an additional 12 hours' heating, solutions were still unchanged in appearance.

Conclusions-A $[Mg(Ac)_2+8\ H_2O]$ melt can be satisfactorily stored in processing at a temperature as high as 72° C. The addition of only 1% stoichiometric equivalent of acid is sufficient to stabilize process liquors to a temperature of at least 83° C.; without added acid the liquor unacceptably hydrolyzes over time. However, for short heating residence times of under an hour, unacidified process liquor can be successfully sprayed into the granulator/dryer without concerns over hydrolysis.

If hydrolysis unavoidably or accidentally occurs, process liquor can be filtered prior to spraying. However, such filtered liquors will now be acidic, and this will lead to an acidic end product. If such an acid product is unacceptable to any particular end use, then the excess acid must be volatized in a final drying step.

EXAMPLE II

Solubility of Calcium Acetate in Magnesium Acetate Melts

Four melts were prepared in hermetically sealed jars, of the following compositions:

I. $(Mg(Ac)_2+0.01\ Ca(Ac)_2+8\ H_2O)$

II. $(Mg(Ac)_2+0.038\ Ca(Ac)_2+8\ H_2O)$

III. $(Mg(Ac)_2+0.054\ Ca(Ac)_2+8\ H_2O)$

IV. $(Mg(Ac)_2+0.064\ Ca(Ac)_2+8\ H_2O)$

Jars were heated in a 75° C. oven for at least one hour, and then examined for clarity of the resulting solutions. Results are as follows:
I. Clear
II. Clear
III. Light turbidity, gelatinous solids
IV. Heavy turbidity, gelatinous solids Conclusions-The solubility of $Ca(Ac)_2$ in $Mg(Ac)_2/H_2O$ systems, under the conditions outlined, is greater than 3.7%, but less than 5.1%, where concentrations are expressed as mol fractions, or $Ca/(Ca+Mg)$. Solubility is therefore approximately 4 mol. % Ca. Process liquors containing this amount or less of calcium can easily be sprayed. Liquors containing more calcium than this can be sprayed, to a limit, using specially designed spray nozzles.

EXAMPLE III

Stability of Concentrated $Mg(Ac)_2$ Melts

A melt of composition $[Mg(Ac)_2+6\ H_2O]$ was prepared in a hermetically sealed jar heated to 75° C. for one hour and 20 minutes. The resulting melt had a relatively low viscosity and was clear, with no evidence of hydrolysis product. Such a melt concentration is therefore feasible in the process liquor of this invention.

A melt of composition $[Mg(Ac)_2+5\ H_2O]$ was prepared in a hermetically sealed jar heated to 75° C. for 1½ hours. The medium-viscosity liquor was clear except for the presence of an extremely small concentration of glittering microcrystals. Such a melt concentration is feasible for processing in the granulator/dryer of this invention. The net reaction to form product in this case is $[Mg(Ac)_2 + 5 H_2O] \rightarrow Mg(Ac)_2 \cdot 4 H_2O + H_2O\uparrow;$ i.e., only one mol of water per mol of product need be evaporated in this low-cost processing scheme.

EXAMPLE IV

Drying of [Mg(Ac)$_2$+8 H$_2$O] Melt

A melt of composition [Mg(Ac)$_2$+8 H$_2$O] was prepared in a hermetically sealed jar. A portion of the cooled melt was poured in a thin layer into a Petri dish, where it was seeded with Mg(Ac)$_2$.4H$_2$O crystals, and stirred. The entire mass froze within 2,3 minutes of seeding. A sample of the freeze was diluted with water, to give a solution pH of 7.4.

Two days later, after storage of the freeze at room conditions, the freeze was still wet, even though the outer surface seemed dry.

The freeze was then stored over Drierite. One day later the solid was only slightly more dry.

Several days later, after storage over Drierite, the solid surface was dry. But the portion in contact with the Petri dish glass surface was still damp.

Conclusion: A freeze of overall composition [Mg(Ac)$_2$+8 H$_2$O] is extremely slow to dry at room temperature. A freeze consists of Mg(Ac)$_2$.4 H$_2$O microcrystals wet with viscous Mg(Ac)$_2$ liquor. It appears the only hope of drying these melts, or freezes, is in thin layers.

EXAMPLE V

Granulation/Drying of [Mg(Ac)$_2$+7 H$_2$O] Melt

A bench-scale pilot operation was carried out to produce non-spherical granules of magnesium acetate hydrate. Technical grade Mg(Ac)$_2$.4H$_2$O was blended with sufficient water to produce a melt of the composition [Mg(Ac)$_2$+7 H$_2$O]. The system was maintained at 75° C. with stirring in a semi-closed vessel.

Hot melt was pumped from the reservoir through a high pressure nozzle rated for 1000 lb/sq.in. Flow rate was about 8 grams melt per minute. Melt was sprayed into a 5-gallon plastic drum rotating at the speed of about 60 revolutions per minute. The drum was neither heated nor cooled.

Room temperature ambient air was blown into the drum at the rate of about 1.5 cu. ft. per minute.

The melt spray was initially directed at a heel of coarse sand in the drum (−4, +20 mesh). As product built up in the drum, it was continually allowed to spill out. Eventually, after about 2 hours of continuous operation the sand was all changed out.

A sample of product centered in size as −5, +8 mesh. Particles had a "potato" shape, and no particles were spherical. Using a standard mineral abrasion and impact test, the % degradation of product was found to be 1.52%. This compared to a granular urea value of 2.13%. Product therefore exhibited an acceptable resistance to friability.

Crush strength was measured on individual particles. The average crush strength (N=20) was found to be 4.3 lbs./particle for the product, with an average mean deviation of 18%. After storage in a closed container overnight, crush strength of the product rose to an average of 6.4 lbs/particle. Particle size of both materials was equivalent. Therefore product gained strength through an autonomous curing process.

A 10% solution of product in distilled water gave a pH of 7.5. Insolubles in the product measured less than 0.1%. Composition of product was found to be Mg(Ac)$_2$.3.8H$_2$O.

EXAMPLE VI

Quiescent Dissolution of Magnesium Acetate Pellets

Two materials were selected for the quiescent dissolution test:
I. The product of Example V.
II. A similar product, but one which contained about 3% by weight of encapsulated raw material MgO, or Mg(OH)$_2$. The pH of a 10% solution of this product in water was 9.6.

Particles of identical size were hand-selected for the study.

An insulated cylindrical vessel was partially filled with crushed ice and water. A stainless steel flat-bottomed tea strainer was pressed down atop the floating ice until the strainer was half immersed. The strainer was secured in place. When temperature equilibrium had been established, three granules each of I. and II. (above) were placed on the flat bottom of the strainer. All particles were roughly 4 mm in diameter. Particles were observed as they dissolved. Temperature at the dissolving site was +1° C.

In approximately 20 minutes all of the I. pellets were completely dissolved. After 70 minutes, 2 out of 3 of the II. pellets had just completely dissolved, and the experiment was terminated.

Conclusions-The presence of encapsulated, unreacted raw material MgO (or Mg(OH)$_2$) in the product seriously affects the quiescent dissolution rate, and therefore the rate of ice-melting by product deicer. The product of the present invention is virtually free of the skeletal barrier solids, and dissolves freely, limited only by the usual Nernst diffusion barrier of concentrated solute at solid surfaces.

EXAMPLE VII

Production of Technical Grade Magnesium Acetate Tetrahydrate 116 parts of commercial lightburned MgO were blended with 347 parts of water. To this blend, with agitation, 332 parts of glacial acetic acid were slowly added. After reaction was essentially complete, the process liquor was heated to 75° C. for 10 minutes. The pH was then adjusted to a value of 8.0. This liquor was then clarified of solids. Liquor was then sprayed into a drying zone to produce essentially magnesium acetate tetrahydrate. The following is an analysis of product, Mg(Ac)$_2$.4H$_2$O basis:

| Impurity | % |
| --- | --- |
| Fe | <0.05 |
| Cl | 0.06 |
| SO$_4$ | 0.01 |
| Ca | 0.11 |
| Insolubles (in 1% HAc) | <0.05 |

Although this invention has been described in connection with specific forms thereof, it will be appreciated by those skilled in the art that a wide variety of equivalents may be substituted for those specific elements and steps of operation shown and described herein, that certain features may be used independently of other features, and that parts may be reversed, all without departing from the spirit and the scope of this invention as defined in the appended claims.

I claim:

1. A process for the manufacture of solid magnesium calcium acetate comprising the following steps:
   a. introducing a raw material ore containing active MgO and active CaO into an agitated reaction vessel, whereby the mol fraction of calcium falls in the range 0-12%;
   b. simultaneously introducing to the reaction vessel a quantity of acetic acid stoichiometrically equivalent to the active MgO and active CaO contained therein;
   c. simultaneously introducing to the reaction vessel x mols of water per mol of acetic acid, where x equals at least 2.55;
   d. holding the contents of the reaction vessel at a temperature of 60°-80° C. until chemical reaction is complete;
   e. spraying the contents of the agitated reaction vessel onto a moving bed of magnesium calcium acetate hydrate granules;
   f. simultaneously introducing air into the moving bed, sufficient to dry the granules;
   g. holding the granules in the moving bed for a time sufficient to achieve the required granule size distribution; and
   h. discharging the granules from the moving bed when the desired granule size distribution has been achieved.

2. The process of claim 1. wherein the mol fraction of calcium is 0-9%.

3. The process of claim 1. wherein the mol fraction of calcium is 0-6%.

4. The process of claim 1. wherein x falls within the range 4-9.

5. The process of claim 1. wherein x falls within the range 5-7.

6. The process of claim 1. wherein the contents of the reaction vessel are clarified prior to spraying.

7. The process of claim 1. wherein the contents of the reaction vessel are passed through a pre-heater prior to spraying.

8. The process of claim 1 wherein product is dried to the degree that the mols of water per mol of magnesium acetate in the product falls in the range 1-4.

9. The industrial grade magnesium calcium acetate product of claim 1.

10. The technical grade magnesium calcium acetate product of claim 6.

11. The process of claim 1 in which
    a. contents of the agitated reaction vessel are sprayed onto a moving bed of magnesium calcium acetate hydrate granules;
    b. sufficient air is simultaneously introduced into the moving bed to dry the granules;
    c. granules are held in the moving bed for a time sufficient to achieve the required granule particle size distribution; and
    d. the granules are discharged from the moving bed when the desired particle size distribution has been achieved.

12. The process of claim 1 in which the contents of the reaction vessel are conventionally spray-dried to produce a solid product.

13. The process of claim 1. in which the contents of the reaction vessel are sprayed onto a flaker, and dried to a solid product.

14. The process of claim 1 wherein up to 5% stoichiometric excess of acetic acid is introduced to the reaction vessel.

* * * * *